United States Patent [19]
Martin

[11] Patent Number: 5,297,178
[45] Date of Patent: Mar. 22, 1994

[54] HIGH SECURITY COUNTER
[75] Inventor: John R. Martin, Rockford, Ill.
[73] Assignee: Arachnid, Inc., Rockford, Ill.
[21] Appl. No.: 853,507
[22] Filed: Mar. 18, 1992
[51] Int. Cl.⁵ ............................................. G06F 11/00
[52] U.S. Cl. .................................... 377/26; 377/24.1; 364/561
[58] Field of Search ................... 377/24.1, 26, 24.2; 364/561

[56] References Cited
U.S. PATENT DOCUMENTS

| 4,559,637 | 12/1985 | Weber | 364/561 |
| 4,642,787 | 2/1987 | McCarthy et al. | 364/561 |
| 4,803,646 | 2/1989 | Burke et al. | 377/24.1 |
| 4,860,228 | 8/1989 | Carroll | 364/561 |
| 5,046,029 | 9/1991 | Ikeda | 364/561 |
| 5,103,411 | 4/1992 | Shida et al. | 377/24.1 |

Primary Examiner—John S. Heyman
Attorney, Agent, or Firm—McAndrews, Held & Malloy, Ltd.

[57] ABSTRACT

A high security counting system is shown for counting events represented by an event signal. The counting system includes a nonerasable programmable read only memory which is programmed by a programmer under the control of a controller. The controller is responsive to an event signal for controlling the programmer to program a bit from a first value to a second value wherein each bit programmed to a second value represents a unit of count and the number of bits programmed to the second value represents the count of said counter.

16 Claims, 3 Drawing Sheets

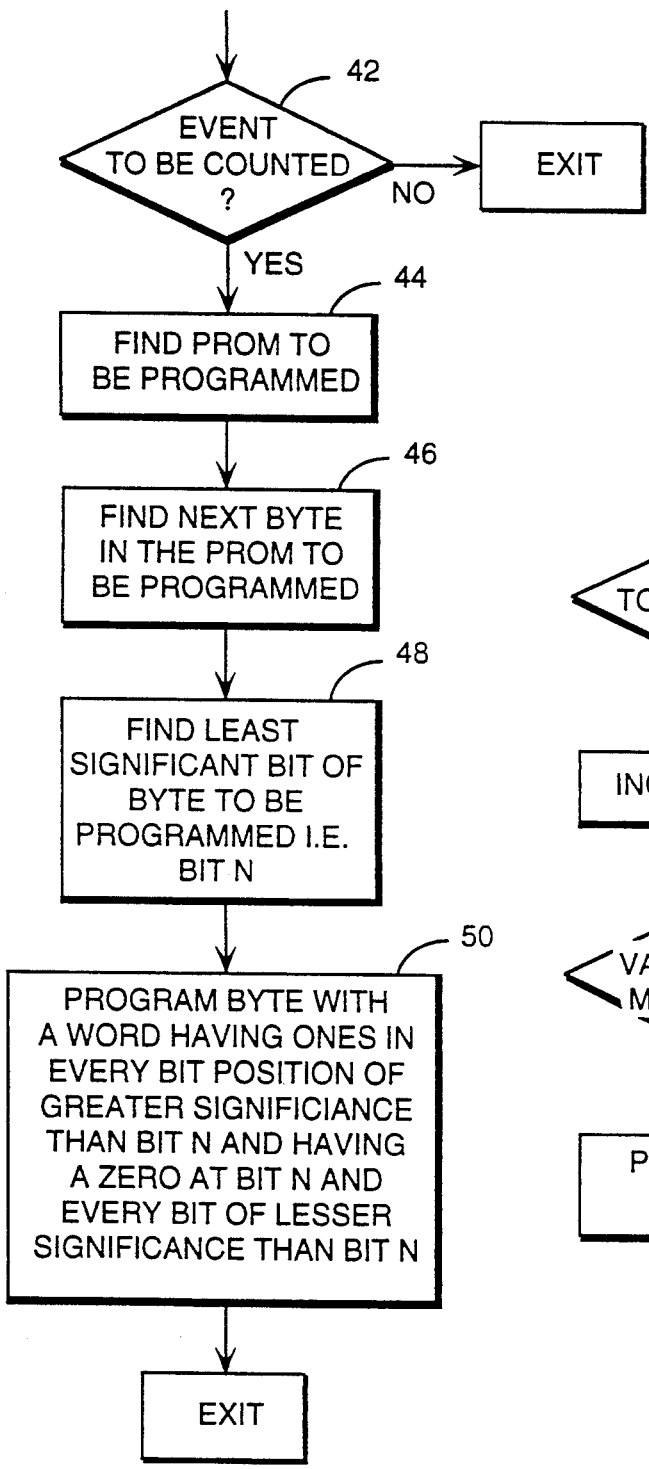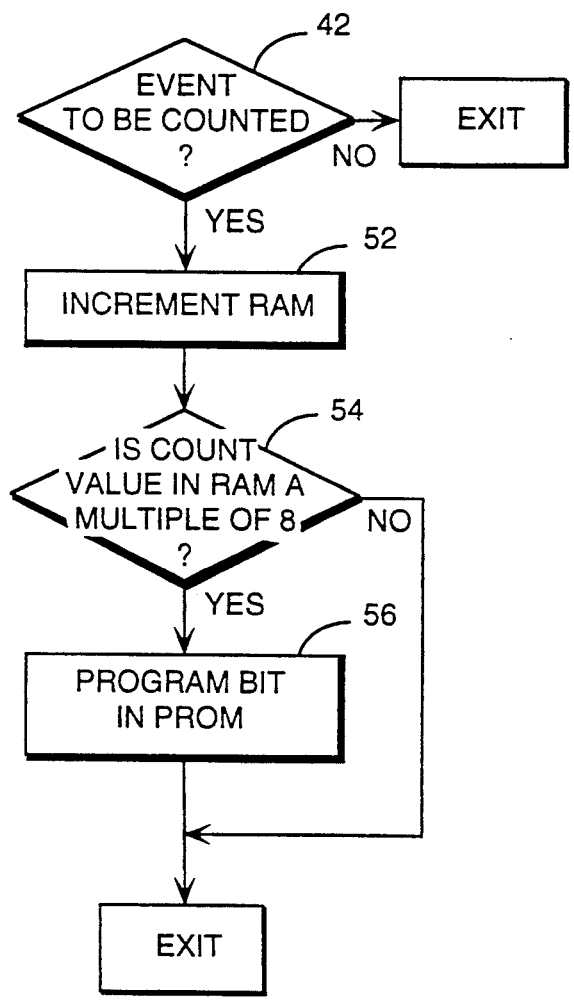
FIG. 2     FIG. 4

HIGH SECURITY COUNTER

TECHNICAL FIELD

The present invention relates to a counter system and more particularly to a high security counter having a count value stored therein that cannot be decreased.

BACKGROUND OF THE INVENTION

Mechanical and electromechanical counters are known for counting the number of times an event occurs. These counters have been used in coin operated amusement machines and gaming devices to count coin intake. These types of counters are also used in automobiles to provide odometer records as well as in various other applications. These counters however can be costly. Further, the count value indicated by these types of counters can be easily tampered with. For example, known counters can be bypassed by merely disconnecting them. The count value of counters employing mechanical counting wheels can be altered by manual movement of the wheels. The count value of mechanical and electromechanical counters can also be altered by subjecting the counter to physical shock. Software counters that count in a binary fashion, i.e., 001, 010, 111 . . . , are also known. The contents of these counters are typically stored in a random access memory, RAM. This type of counter can be tampered with however by reprogramming the count value in the RAM to a lower value.

SUMMARY OF THE INVENTION

In accordance with the present invention the disadvantages of prior counters as discussed above have been overcome. The high security counting system of the present invention utilizes a programmable read only memory counter to maintain a count value that cannot be decreased by tampering.

More particularly, the high security counting system of the present invention counts events represented by an event signal. The counting system includes a programmable memory counter having a number of storage elements, each of which is programmable from a first value to a second value and not programmable from the second value to the first value. A controller is responsive to an event signal for controlling a memory programmer to program a storage element from the first value to the second value wherein each storage element programmed to a second value represents a unit of count and the the number of storage elements programmed to the second value represent the total count or count value of the counter.

These and other objects and advantages of the invention as well as details of an illustrative embodiment will be more fully understood from the following description and the drawings.

BRIEF DESCRIPTION OF THE DRAWINGS

FIG. 2 is a flow chart illustrating a routine for programming the PROMs depicted in FIG. 1;

FIG. 4 is a flow chart illustrating an alternate embodiment of the routine to program a PROM in accordance with the present invention.

BEST MODE FOR CARRYING OUT THE INVENTION

Figure 1:
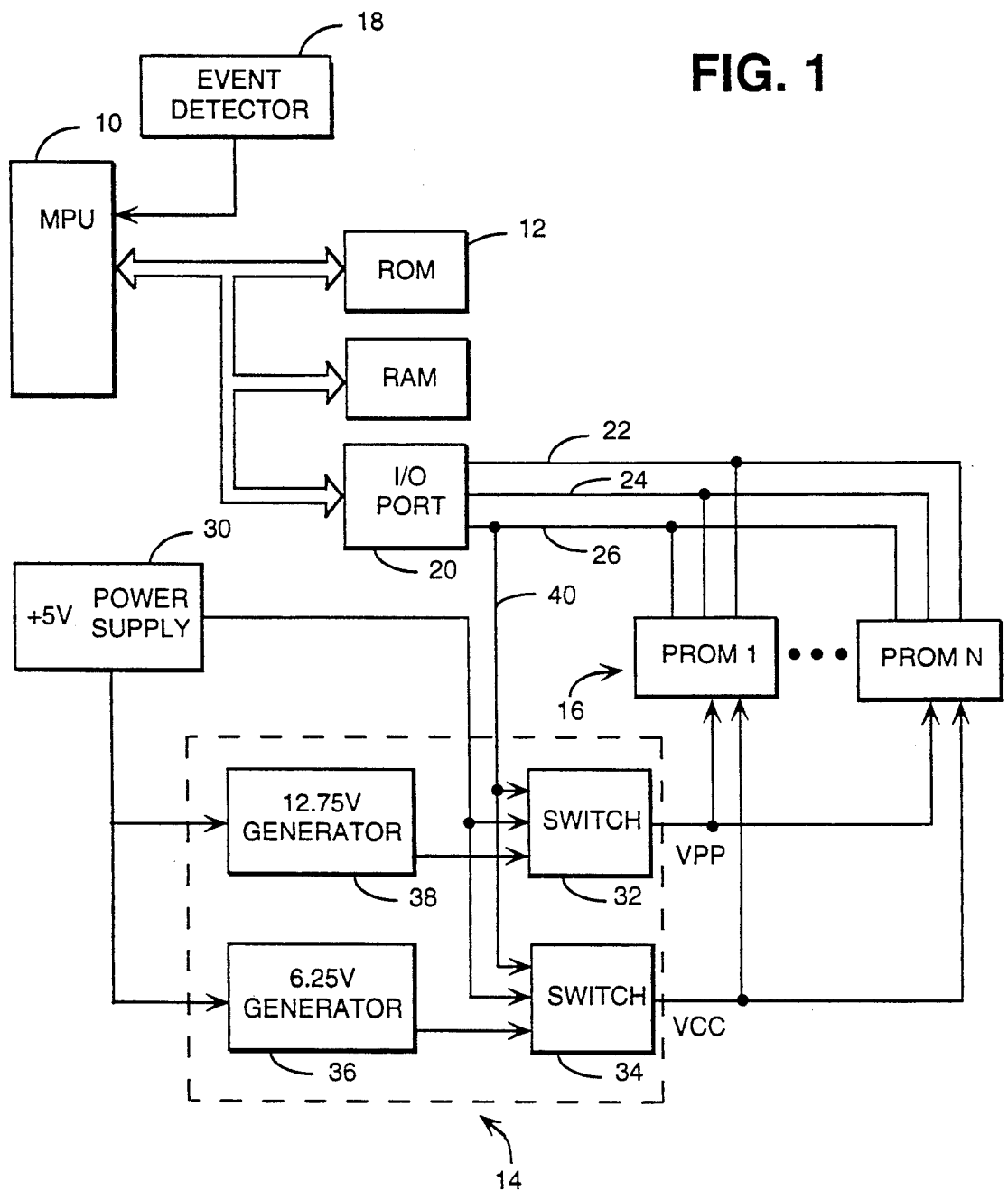
FIG. 1 is a block diagram of the counting system of the present invention.

A high security counting system in accordance with the present invention is depicted in FIG. 1. The system includes a microprocessor 10 that operates in accordance with software stored in a ROM 12 to control a programmer 14 to program a nonerasable programmable read only memory 16. The nonerasable programmable read only memory 16 may take the form of one or more PROMs as illustrated. Alternatively, the nonerasable programmable read only memory 16 may take the form of one or more WORMs or the like wherein each storage element within the memory is programmable from a first value to a second value but is not programmable from the second value back to the first value. Under the control of the microprocessor 10, the memory 16 is programmed to form a counter, the count value of which once programmed, cannot be decreased so as to provide a relatively tamper-proof record of the number of events which have occurred as detected by an event detector 18. The event detector 18 may be any device that generates a signal upon the occurrence of an event which is to be counted. For example, the event detector 18 may take the form of a coin detector such as used in gaming machines or other coin operated amusement machines. Upon detection of the input of a coin or coins of a particular denomination, the detector 18 outputs an event signal that is coupled to the microprocessor 10.

As shown in FIG. 1, the microprocessor 10 accesses the memory 16 via an input/output port 20 and an address bus 22, data bus 24 and control bus 26 connected directly to the PROMs of the memory 16. Two voltages, VPP and VCC are applied to each of the PROMs of the memory 16. Except when programming of the PROMs occurs, VCC and VPP are each set to +5 volts as provided by a power supply 30 coupled to the PROMs via respective switches 32 and 34. In order to program the PROMs of the memory 16, VCC is changed from +5 volts to 6.25 volts as supplied to the PROMs from a 6.25 volt generator 36 and the switch 34. During programming VPP is changed from +5 volts to 12.75 volts provided to the PROMs of the memory 16 from a 12.75 volt generator 38 through the switch 32. In order to program the PROMs of the memory 16 each of the switches 32 and 34 is responsive to a control signal on a line 40 from the microprocessor 10 to switch the PROMs from the +5 volt power supply to 12.75 volts and 6.25 volts respectively.

In accordance with the present invention, the memory 16 is programmed to form a counter. More particularly, in response to an event signal from the event detector 18, the microprocessor 10 controls the programmer 14 to program a storage element in the memory 16 from a first value to a second value wherein each storage element that is programmed to a second value represents a unit of count and the number of storage elements programmed to the second value represents the total count or count value of the counter. Where the memory takes the form of one or more PROMs as illustrated in FIG. 1, a storage element may take the form of one bit in the PROM or the storage element may take the form of a number of bits such as one byte of memory in the PROM. PROMs may be employed for the memory counter 16 such that in their initialized or unprogrammed state, i.e., when the memory counter is empty, each bit location stores a 1. As each event signal is detected, a single bit in the PROMs is programmed to a 0 starting with the least significant bit in the memory counter 16. The total number of 0's stored in the PROMs thus represents the total count or count value of the memory counter 16. Further, the location of the last programmed 0 bit in the PROMs represents the total count or count value of the memory counter 16. Once the location of the last programmed 0 is determined, the microprocessor 10 can thus convert the location to a binary count value used for further processing by the system employing the PROM counter. It is noted that nonerasable programmable memories having a 0 stored in each bit location in the memories initial or unprogrammed state may also be employed in accordance with the present invention.

In order to program one unit of count in one bit location of a PROM counter 16 having a 1 in each bit position in the counter's empty state, the microprocessor 10 operates in accordance with the routine depicted in FIG. 2. The microprocessor 10, at block 42 first determines whether an event detected by the detector 18 as represented by an event signal coupled to the microprocessor 10 should be counted. If so, the microprocessor 10 proceeds to block 44 to find which of the PROMs, PROM 1 through PROM N is to be programmed with the next unit of count. Thereafter, the microprocessor 10 proceeds to block 46 to find the next byte in the PROM to be programmed and at block 48 the microprocessor 10 finds the least significant bit of that byte to be programmed, that bit being referred to as bit n. The microprocessor implements blocks 46 and 48 in accordance with the routine depicted in FIG. 3 as discussed in detail below. After the bit n that is to be programmed is found, the microprocessor proceeds to block 50 to program the bit from a 1 to a 0. It is noted that if each storage element, for example one bit, in the memory counter 16 is not individually addressable, but a group of storage elements such as one byte is addressable, the microprocessor 10 programs one byte a number of times equal to the number of bits in that byte. More particularly, as shown at block 50, the microprocessor programs the byte containing bit n with a word having 1's in every bit position of greater significance than bit n and having a 0 at bit n as well as every bit position of lesser significance than bit n. Assuming that the first byte in the empty PROM counter 16 is represented by the 8 bit word, 11111111, then upon the first event detected, the microprocessor 10 controls the programmer 14 and PROM counter 16 to program the least significant bit of that byte to 0. This is accomplished by addressing the byte and programming it with the word 11111110. Upon detecting the occurrence of a second event, the microprocessor addresses the same byte and programs it to 11111100. This operation continues until all 8 bits are 0's after which the microprocessor 10 addresses the next sequential byte in the memory counter 16.

In one embodiment of the present invention, in addition to the PROM counter 16, a software counter in a portion of a battery backed up RAM 60 is utilized to store a binary count value representing the total number of events detected. Here this term binary count value means a count value that changes from 000 to 001 to 010 to 011 etc., only three significant positions being shown for simplicity. The system then may require that the count in the RAM 60 agree with the count in the PROM 16. In the event of a disagreement, as determined by the microprocessor 10, the microprocessor 10 can prevent the device utilizing the counting system from operating and/or send an alarm signal.

Further, the battery backed up RAM 60 can store a number that is greater than the PROM such that a new PROM bit is programmed only after n counts. In this embodiment the battery backed up RAM 60 provides the accurate count and the PROM counter 16 provides a tamper-proof count within n of the accurate total, allowing n times the capacity for a given PROM. In this embodiment, the microprocessor 10 operates in accordance with the routine depicted in FIG. 4 as follows. After determining that an event has been detected that should be counted at block 42, the microprocessor 10 proceeds to block 52 to increment the binary count value stored in the counter portion of the RAM 60. Thereafter, at block 54, the microprocessor 10 determines whether the count value in the RAM counter is a multiple of n for example, n=8. If the count value in the RAM counter is a multiple of n, the microprocessor 10 proceeds to block 56 to program one bit in the PROM counter 16 in accordance with steps 44, 46, 48 and 50 described above with reference to FIG. 2.

Figure 3:
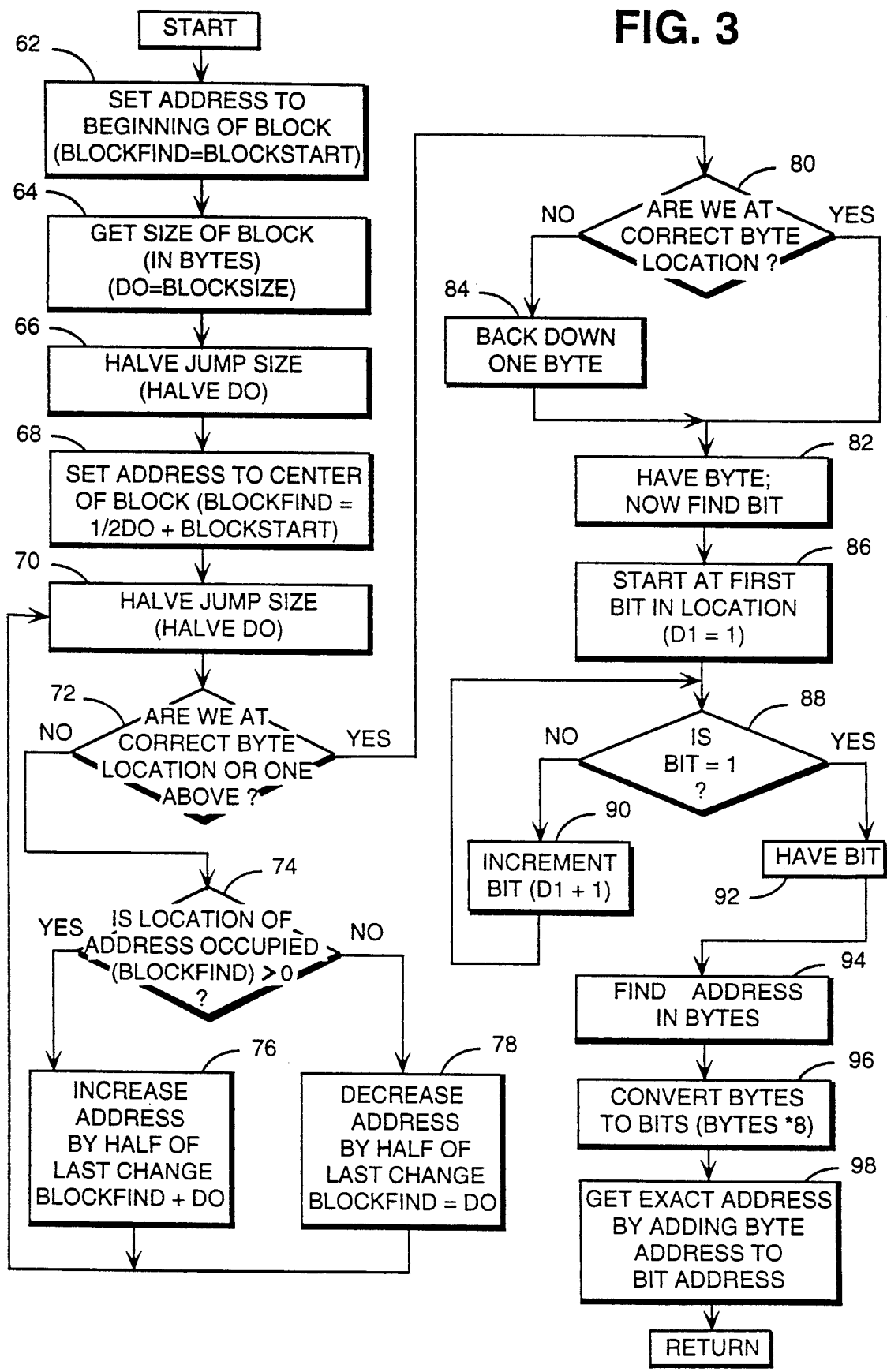
FIG. 3 is a flow chart illustrating a routine for locating the last bit programmed in a PROM.

In order to find the location of the last bit programmed and thus the location of the next bit to be programmed in the PROM counter 16, the microprocessor 10 operates in accordance with the routine depicted in FIG. 3. More particularly, the microprocessor at block 62 sets an address to the beginning of a block of memory. Thereafter, at block 64, the microprocessor determines the size of the memory block and proceeds to block 66 to determine a value that is equal to half of the memory block size. The microprocessor 10 then proceeds to block 68 to set an address to the center of the memory block. At block 70, one-half of the value of the jump size is again determined, the microprocessor then proceeding to block 72. At block 72, the microprocessor 10 determines whether the address is at a correct byte location or one above and if not, the microprocessor proceeds to block 74 to determine whether all of the bits of the byte are occupied by 0's or 1's. If the bits of the byte are all 0's, the microprocessor proceeds from block 75 to block 76. At block 76, the microprocessor 10 increases the address by half of the last change and proceeds to block 70. If all of the bits in the byte are 1's, the microprocessor proceeds from block 74 to decrease the address by half of the last change and thereafter proceeds to block 70. When it is determined that the correct byte or the byte immediately above the correct byte has been found, the correct byte containing the last programmed 0, the microprocessor proceeds to block 80. At block 80, the microprocessor determines whether the byte is the correct byte or one above. If the byte is the correct byte, the microprocessor proceeds to block 82. However, if the byte is one above the correct byte, the microprocessor first proceeds to block 84 to back the address down to the correct byte. At block 82 the microprocessor determines that the byte containing the last programmed 0 has been found and proceeds to block 86 to determine the bit location of the last 0 programmed. At block 88, the microprocessor determines whether the first bit in the byte is equal to a 1. If not, the microprocessor proceeds to block 90 to increment the bit location by 1 and to return to block 88. After finding the first bit in the byte that is a as opposed to a 0, the microprocessor proceeds to block 92. If the microprocessor is looking for the next bit to be programmed, the microprocessor at block 92 determines that the bit found at block 88 is the bit location that it was looking for. If the microprocessor is looking for the last programmed 0, the microprocessor at block 92 merely decrements the bit location found at block 88. Thereafter, at block 94, the microprocessor 10 at blocks 94, 96 and 98 determines the address of the bit that it was searching for.

The memory counter 16 in accordance with the present invention cannot be tampered with in a manner to decrement the count value stored therein because although the memory can be programmed to change a bit value from a first value to a second value, it cannot be programmed to change a bit value from the second value to the first value. Many modifications and variations of the present invention are possible in light of the above teachings. Thus it is to be understood that, within the scope of the appended claims the invention may be practiced otherwise than as described hereinabove.

I claim:

1. A high security counting system for counting events represented by an event signal comprising:
    a programmable memory counter having a plurality of sequentially arranged memory locations, each memory location having a unique memory address and including a predetermined number of storage elements, each storage element being programmable from a first value to a second value and not programmable from said second value to said first value, the number of storage elements programmed to said second value representing the count of said programmable memory counter;
    a programmer coupled to said programmable memory counter; and
    a controller responsive to an event signal for controlling said programmer to program a storage element from said first value to said second value, wherein said controller controls said programmer to sequentially program the storage elements within a memory location by reprogramming a respective memory location a predetermined number of times equal to the number of storage elements at said memory location.

2. A high security counting system as recited in claim 1 wherein said controller controls said programmer to program the storage elements within a memory location sequentially starting with a storage element in a least significant position in said memory location.

3. A high security counting system as recited in claim 2 wherein said controller includes means for locating the position of the last storage element programmed to said second value.

4. A high security counting system as recited in claim 1 wherein said memory counter includes a PROM, each addressable memory location represents a byte in said PROM, and each storage element represents a bit in said PROM.

5. A high security counting system as recited in claim 1 wherein said controller controls said programmer to program said memory locations sequentially starting with a memory location in a least significant position in said memory counter.

6. A high security counting system for counting events represented by an event signal comprising:
    a nonerasable programmable read only memory counter having a plurality of storage elements, each storage element being programmable from a first value to a second value, the number of storage elements programmed to said second value representing the count value of said nonerasable programmable read only memory counter;
    a random access memory counter adapted to store a count value;
    a programmer coupled to said programmable memory counter; and
    a controller responsive to an event signal for incrementing said random access counter by one unit and controlling said programmer to program a storage element from said first value to said second value, said controller further being adapted to compare the count value stored in said random access memory counter to the count value of said nonerasable programmable read only memory counter and produce an alarm signal if said count values are not equal.

7. A high security counting system as recited in claim 6 wherein said controller controls said programmer to program the storage elements in said programmable memory counter sequentially starting with a storage element in a least significant position in said memory, the position of the last storage element programmed in said memory representing the count of said counter.

8. A high security counting system as recited in claim 7 wherein said controller includes means for locating the position of the last storage element programmed to said second value.

9. A high security counting system as recited in claim 7 wherein said storage elements are arranged in said memory in groups, each group having a predetermined number of storage elements therein and each group having an associated address, said controller controlling said programmer to program each storage element in a group sequentially by reprogramming said group of storage elements said predetermined number of times.

10. A high security counting system as recited in claim 6 wherein each storage element represents a bit in said programmable read only memory.

11. A high security counting system as recited in claim 6 wherein each storage element represents a byte in said programmable read only memory.

12. A high security counting system for counting events represented by an event signal comprising:
    a nonerasable programmable read only memory counter having a plurality of sequentially addressable byte locations, each byte location including a predetermined number of bit locations, each bit location being programmable from a first value to a second value, the number of storage elements programmed to said second value representing the count of said counter;
    a programmer coupled to said memory counter; and
    a controller responsive to an event signal for controlling said programmer to program said bit locations from said first value to said second value by first selecting a byte location to be programmed and thereafter determining a bit location to be programmed by sequentially checking the bits within said selected byte location to determine if a respective bit location is set to said first value or said second value.

13. A high security counting system as recited in claim 12 wherein said controller controls said programmer to program bit locations in said memory counter sequentially starting with the least significant bit location in said memory counter.

14. A high security counting system as recited in claim 13 wherein the location of the bit last programmed in said memory counter represents the count of said counter, said controller including means for locating the bit last programmed to said second value.

15. A high security counting system for counting events represented by an event signal comprising:
- a nonerasable programmable read only memory counter having a plurality of storage elements, each of which is programmable from a first value to a second value, the number of storage elements programmed to said second value representing the count of said counter;
- a random access memory counter adapted to store a count value;
- a programmer coupled to said programmable memory counter; and
- a controller for incrementing said random access counter by one unit in response an event signal and controlling said programmer to program a storage element from said first value to said second value every Nth time said random access counter is incremented, where N is a whole number greater than one.

16. A high security counting system as recited in claim 15 wherein the location of the storage element last programmed in said memory counter represents the count of said counter and said controller includes means for locating the bit last programmed to said second value and converting the location to a binary count value.

* * * * *